US007031943B1

(12) United States Patent
James et al.

(10) Patent No.: US 7,031,943 B1
(45) Date of Patent: Apr. 18, 2006

(54) DIGITAL LICENSE AGREEMENT

(75) Inventors: Arthur James, San Jose, CA (US); Michelle Brent, San Jose, CA (US); Peter Corless, Mountain View, CA (US); Sanjay Khera, San Jose, CA (US); Soyoung Park, Alameda, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/568,652

(22) Filed: May 10, 2000

(51) Int. Cl.
*G06F 17/60* (2006.01)

(52) U.S. Cl. ........................................................ 705/59

(58) Field of Classification Search ............ 705/50–54, 705/57–59, 64, 67, 75; 713/155–159, 164–173; 380/201, 28–30, 277–279; 707/9–10
See application file for complete search history.

(56) References Cited

U.S. PATENT DOCUMENTS

| | | | | |
|---|---|---|---|---|
| 5,692,206 | A * | 11/1997 | Shirley et al. | 395/793 |
| 5,745,879 | A * | 4/1998 | Wyman | 705/1 |
| 5,765,152 | A * | 6/1998 | Erickson | 707/9 |
| 5,910,987 | A | 6/1999 | Ginter et al. | 380/24 |
| 5,915,019 | A | 6/1999 | Ginter et al. | 380/4 |
| 5,917,912 | A | 6/1999 | Ginter et al. | 380/24 |
| 5,920,861 | A | 7/1999 | Hall et al. | 707/9 |
| 5,940,504 | A * | 8/1999 | Griswold | 380/4 |
| 5,943,422 | A | 8/1999 | Van Wie et al. | 380/9 |
| 5,949,876 | A | 9/1999 | Ginter et al. | 380/4 |
| 5,982,891 | A | 11/1999 | Ginter et al. | 380/4 |
| 5,982,900 | A | 11/1999 | Ginter et al. | 395/186 |
| 6,044,469 | A * | 3/2000 | Horstmann | 713/201 |
| 6,219,652 | B1 * | 4/2001 | Carter et al. | 705/59 |
| 6,289,452 | B1 * | 9/2001 | Arnold et al. | 713/175 |

FOREIGN PATENT DOCUMENTS

EP 0 809 221 A2 * 11/1997

OTHER PUBLICATIONS

Licensing Moves, Aug. 11, 1995, Daily News Record, v25, n154, pS34(1), ISSN: 0162-2161.*

* cited by examiner

*Primary Examiner*—Mary D. Cheung

(57) ABSTRACT

A method and system for licensing intellectual properties. A user can acquire a license conveying rights in intellectual properties by accessing a designated site and making a digital license request. Terms and conditions that can be accepted by the user are then made available to the user in the form of a model digital license agreement. Agreement to the terms of the model digital license agreement by the user, and acceptance thereof by the Licensor, creates a digital license agreement that conveys the intellectual property rights defined in the digital license agreement. The final form of the digital license agreement, after agreement thereto by the Licensor and the user, creates a digital license agreement representation that is a digital representation of the terms and conditions that define the intellectual property rights conveyed.

30 Claims, 5 Drawing Sheets

DIGITAL LICENSE AGREEMENT

TECHNICAL FIELD

The present invention relates to the electronic transfer of information, particularly intellectual property, over computer system networks. More specifically, the present invention pertains to the licensing of intellectual properties over the Internet.

BACKGROUND ART

Intellectual properties are becoming more and more central to the world economy. In an information economy, discrete or aggregate values are placed on intellectual properties, and the markets for general or specific applications of these properties are huge. For example, the software industry, which has embodiments of intellectual properties in software products and services, and representations of property rights in licenses, legal contracts and agreements, copyrights, trademarks and patents, currently has annual sales rates of over $135 billion per year.

Increasingly, the Internet (or World Wide Web) is the medium of transmission of intellectual properties such as software products and the like. The Internet uses the Internet Protocol to frame, route, and reassemble digital messages. The transaction of intellectual property is a general transfer of data and data communications over the Internet; intellectual property such as software is simply treated as a bit stream in Internet Protocol. On top of the Internet Protocol are specialized transport layer services, such as HTTP (Hypertext Transfer Protocol) or SMTP (Simple Mail Transfer Protocol). Within these, many messages are encoded in markup languages such as XML (Extensible Markup Language), the World Wide Web Consortium (W3C) metamarkup language based on Standard Generalized Markup Language (SGML), and preferably one of the latest members of the of the SGML family.

With regard to the protection of intellectual property, the prior art takes a defensive posture that is focused on guarding the intellectual property against unauthorized access, duplication and use. Limitations are placed on the use and distribution of a piece of intellectual property, and various means are used to attempt to enforce these limitations. Oftentimes, the limitations can be easily circumvented, and so enforcement can be difficult, and therefore is mostly ineffective.

In addition, while in some cases the prior art may take advantage of the Internet for delivery of intellectual property such as software, the prior art is still encumbered by more traditional mechanisms for conducting the legal and commercial aspects of intellectual property transactions. For example, license agreements and the like must be negotiated, written, reviewed and approved. These more traditional mechanisms can cause delay in the delivery and use of the intellectual property by a purchaser or licensee, and delay in the receipt of payments or royalties due to a seller or licensor.

Recently, some software vendors have developed software products that are stored on floppy disks and/or stored on computer disks that include standard licensing terms that are displayed during the installation process. The floppy disk or the computer disk is inserted into the user's computer and the user initiates the installation process. During the installation process, a copy of a standard licensing agreement is displayed. The user must choose to accept the license terms to continue the installation process. If the user does not accept the license terms, the user cannot install the software product. This creates a problem for users who require non-standard licensing terms. These users must directly contact the vendor of the software product and conduct license negotiations individually. This is expensive and time consuming for both the user and for the vendor of the software product.

Accordingly, what is needed is a method and/or system that can be used to control the assignment of intellectual property that overcomes the problems discussed above. What is also needed is a method and/or system that satisfies the above need and that can accommodate commonly-accepted legal and financial standards and systems. The present invention provides a novel solution to the above needs.

These and other objects and advantages of the present invention will become obvious to those of ordinary skill in the art after having read the following detailed description of the preferred embodiments that are illustrated in the various drawing figures.

DISCLOSURE OF THE INVENTION

The present invention provides a method and system for assigning intellectual property rights. The method and apparatus of the present invention allows for assigning intellectual property rights over the Internet, as well as over internal company computer system networks ("Intranets" or the like) or via non-networked devices. The present invention furthermore reduces the transaction time and transaction costs associated with licensing intellectual properties and allows for the efficient assignment of rights and sale of products.

The present embodiment of the present invention provides a method and system thereof for regulating the distribution of intellectual properties using Internet Protocol with controlling processes and applications. Instead of treating the transaction of intellectual properties as a general transfer of data and data communications, in accordance with the present invention the acts of communication and the communicated data itself are treated as forms of intellectual property rights and intellectual properties. The present invention provides a method and system thereof for declaring rights to an intellectual property and for granting those rights to a purchaser or licensee, in order to more effectively protect the property rights of the intellectual property owner and to make clear the terms and rights of the intellectual property user or purchaser.

In the present embodiment of the present invention, an intellectual property is assigned a unique digital identifier that provides an address for locating the intellectual property using Internet Protocol. Electronic links are enabled between the intellectual property and other intellectual property elements that establish terms for accessing said intellectual property. A model digital license agreement is stored that defines terms for licensing an intellectual property. Electronic links are enabled to the model digital license agreement such that terms for licensing the intellectual property can be viewed. Electronic acceptance of the terms for licensing the intellectual property is enabled such that a license for the intellectual property can be conducted electronically.

In one embodiment, a user can insert information into the model digital license agreement and the user can select from modular components of the model digital license agreement so as to obtain an assignment of rights that meets the needs of the particular user. The user then digitally signs and submits the model digital license agreement. Upon acceptance by the vendor, a digital license agreement embodiment is generated that includes the information submitted by the user and that defines the intellectual property rights represented by the modular components accepted by the user. The above described process allows a user to directly license intellectual property from a vendor efficiently and cost effectively. Also, the user can license intellectual property through a reseller such as, for example an e-commerce site.

In one embodiment of the present invention, assignments of intellectual property rights that are associated with the sale of a product include the generation of a digital license key value that enables the operation of the product. In this embodiment, following assignment of intellectual property rights to the product, the product is sent to the user along with the digital license key value and a copy of the digital license agreement embodiment.

The method and system of the present invention allows for the efficient and cost effective assignment of intellectual property. Furthermore, the method and system of the present invention accommodates commonly accepted legal and financial standards and systems. For example, models of the present invention can be made to represent business policies or legal standards and practices, such as the Uniform Computer Information Transfer Act (UCITA), or other bodies of intellectual property law, to comply with local, national and international legal systems.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing," "enabling," "sending," "determining," "providing," "producing," or the like, refer to actions and processes of a computer system or similar electronic computing device. The computer system or similar electronic computing device manipulates and transforms data represented as physical (electronic) quantities within the computer system memories, registers or other such information storage, transmission or display devices.

Figure 1:
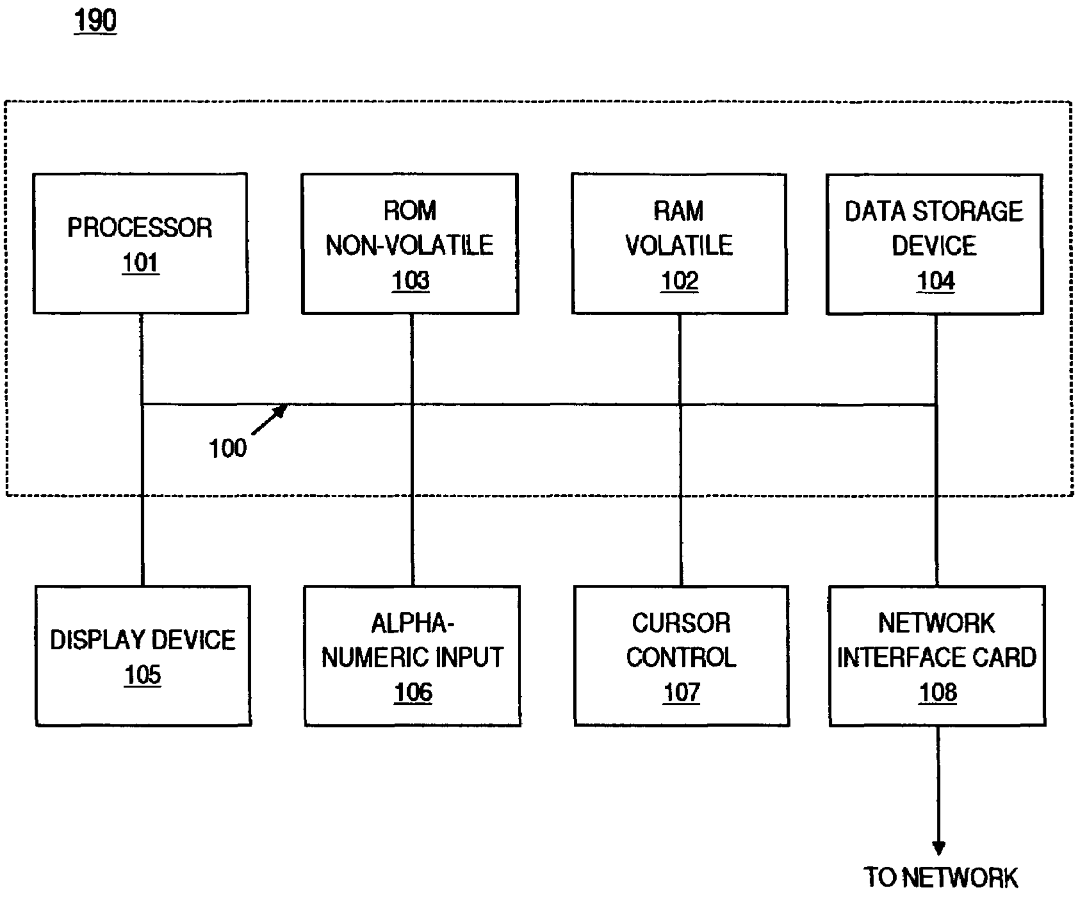
FIG. 1 is a block diagram of an exemplary computer system upon which embodiments of the present invention may be practiced.

Refer now to FIG. 1 that illustrates an exemplary computer system 190 upon which embodiments of the present invention may be practiced. In general, computer system 190 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, a network interface card (NIC) 108 is used to couple computer system 190 onto, for example, a client-server computer system network. In such a network, computer system 190 can exemplify a client computer system and/or a server computer system.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
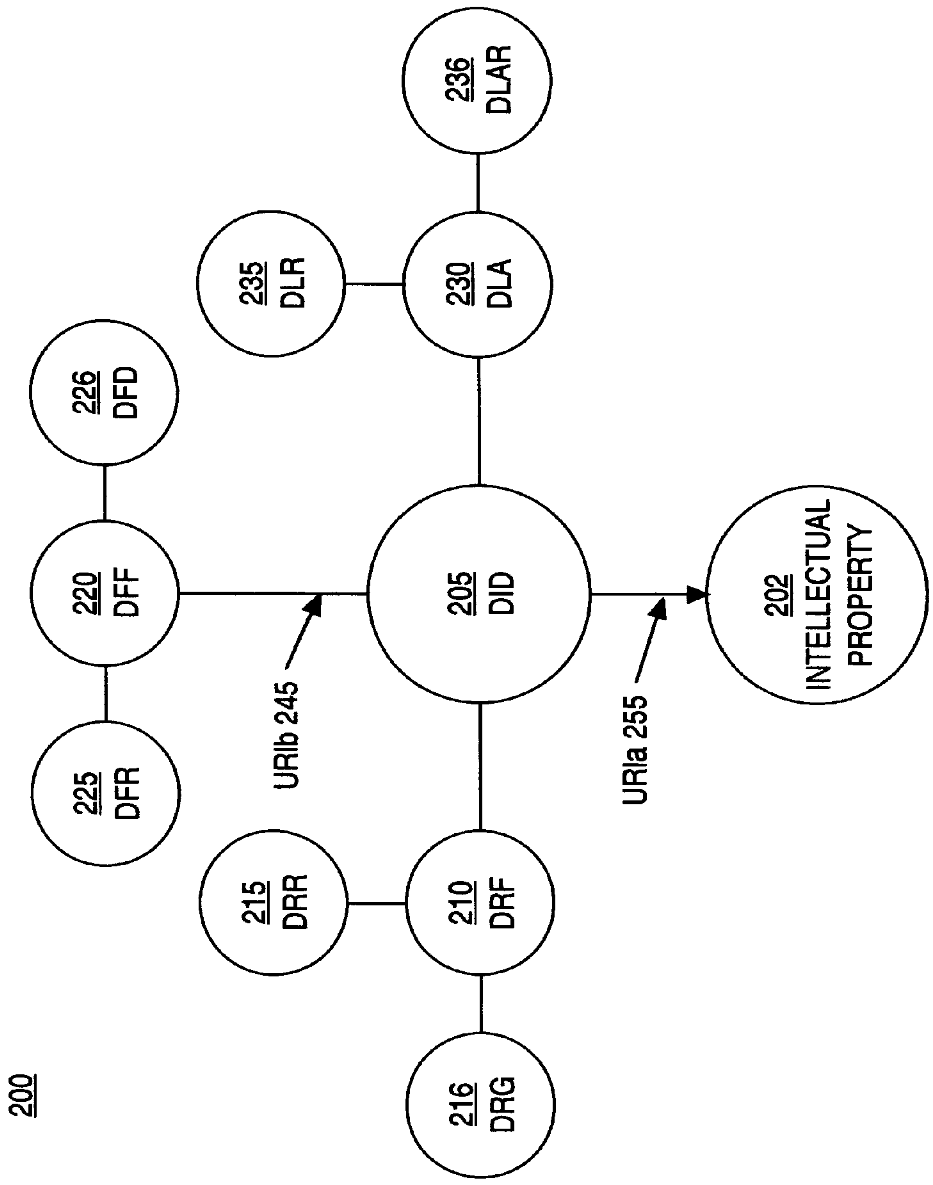
FIG. 2 shows the framework of an intellectual property management system in accordance with one embodiment of the present invention.

FIG. 2 shows an exemplary framework of an intellectual property management system 200 in accordance with one embodiment of the present invention. Intellectual property management system 200 can be implemented over the Internet (e.g., World Wide Web), over an Intranet, or using non-networked devices that are communicatively linked.

Intellectual property 202 can be either a representation or an embodiment of an intellectual property. In accordance with the present embodiment of the present invention, intellectual property 202 is assigned a unique digital identifier (DID) 205, which serves as a Uniform Resource Identifier (e.g., URIa 255) that points to intellectual property 202.

An electronic link or hyperlink is enabled between DID 205 and other intellectual property elements in order to establish the terms and conditions for accessing, using and distributing intellectual property 202. In one embodiment, different URIs (exemplified by URIb 245) may be used to point to these other intellectual property elements.

In one embodiment, digital rights framework (DRF) 210 is an intellectual property element for describing the rights granted by the intellectual property owner with regard to intellectual property 202. Digital rights request (DRR) 215 describes a request made to the owner for access to intellectual property 202 and for other rights associated with the property. Digital rights grant (DRG) 216 describes the rights granted by the owner of intellectual property 202.

In one embodiment, digital feature format (DFF) 220 is an intellectual property element for describing the features of intellectual property 202. Digital feature request (DFR) 225 describes a query made with regard to these features. DFR 225 can also describe a request to add or remove a feature of intellectual property 202. Digital Feature Description (DFD) 226 describes the actual product features in response to the query, or modified features in response to a request for a change in features.

Continuing with FIG. 2, in one embodiment, digital license agreement (DLA) 230 is an intellectual property element describing a license agreement for intellectual property 202. Digital license request (DLR) 235 describes a request made for a digital license, and digital license agreement representation (DLAR) 236 represents the actual digital license agreement made between the intellectual property owner and a licensee.

Still referring to FIG. 2, intellectual property management system 200 provides a system for controlling and regulating the distribution of intellectual properties using Internet Protocol along with controlling processes and applications. Instead of treating the transaction of intellectual properties as a general transfer of data and data communications, in accordance with the present invention the acts of communication and the communicated data itself are treated as forms of intellectual property rights and intellectual properties. The methods of the present invention, operable within the framework of intellectual property management system 200, provide a method and system thereof for declaring rights to an intellectual property and for granting those rights to a purchaser or licensee, in order to more effectively protect the property rights of the intellectual property owner.

Continuing with FIG. 2, in accordance with the present embodiment, all forms of intellectual property can use a common stream of extensible languages (e.g., XML) and control systems to request and respond to requests for access, control, ownership, rights of use or reuse, etc., and to enable network and automatic computerized actions regarding the distribution of the intellectual property once the rights of access have been established and accepted. For example, the intellectual property management system of the present invention can be applied to the distribution and licensing of software over the Internet.

Figure 3A:
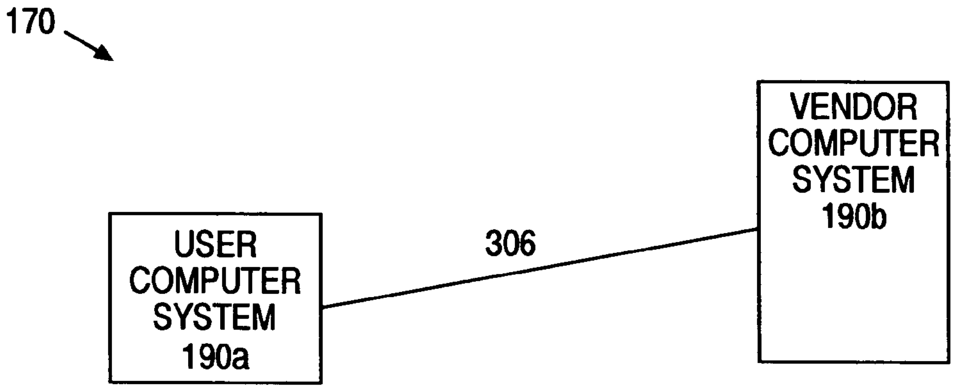
FIG. 3A is diagram exemplifying an interface between a user computer system and a vendor computer system in accordance with one embodiment of the present invention.

FIG. 3A is a block diagram illustrating an exemplary network 170 upon which embodiments of the present invention may be practiced. Network 170 includes vendor computer system 190*b* that is communicatively coupled to user computer system 190*a* via communication lines 306. In one embodiment of the present invention, communication lines 306 couple vendor computer system 190*b* to user computer system 190*a* via the World Wide Web or Internet. Communication lines 306 can also include intranets and the like. The mechanisms for coupling computer systems over the Internet or over Intranets are well-known in the art. This coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). It is appreciated that, in a similar manner, this interface can occur over an Intranet or using non-networked devices that are communicatively linked.

In one embodiment, vendor computer system 190*b* operates a web site. (hereinafter referred to as the "vendor web site") that includes content (e.g., intellectual property 202 of FIG. 2) that is available for sale, license, rent, etc. In one embodiment, the vendor web site and its content (including intellectual property 202) are codified using XML (Extensible Markup Language). A user, operating, for example, user computer system 190*a* can easily access vendor computer system 190*b* by accessing the vendor web site.

Figure 3B:
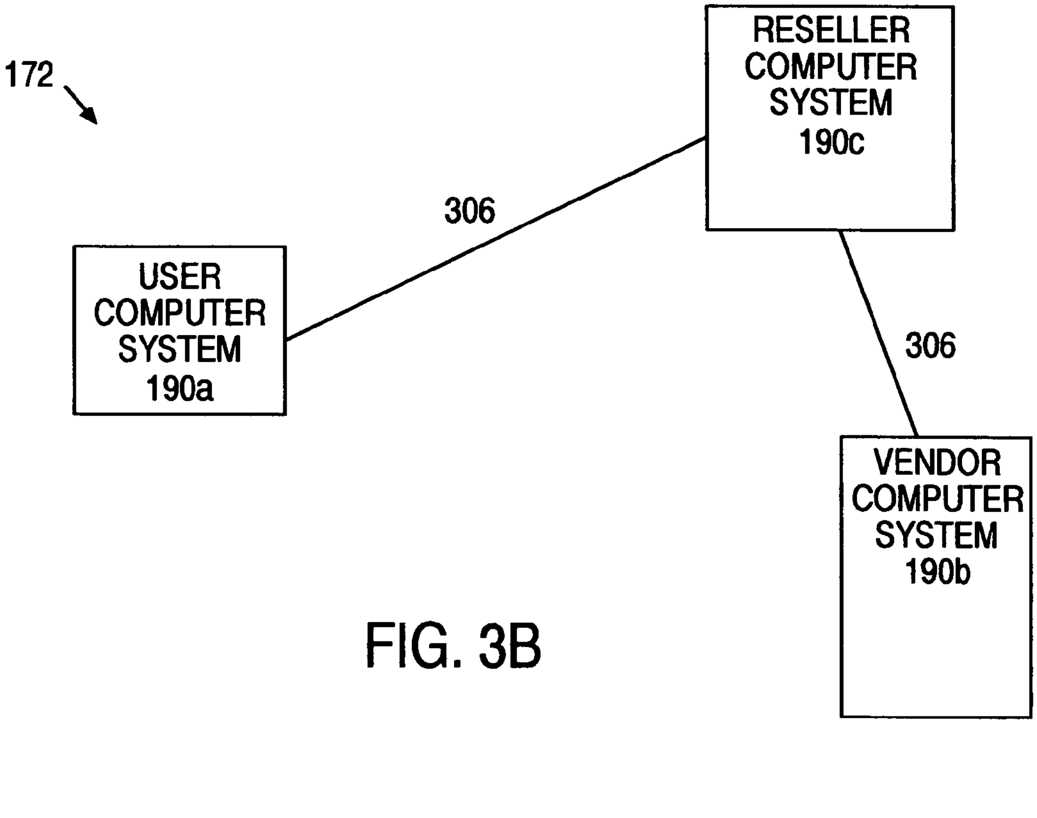
FIG. 3B is diagram exemplifying an interface between a user computer system and a vendor computer system that includes a reseller computer system in accordance with one embodiment of the present invention.

FIG. 3B shows a network 172 in which a reseller acts as an intermediary for the licensing of intellectual property. Network 172 includes vendor computer system 190*b* that is communicatively coupled to reseller computer system 190*c* via communication lines 306. Similarly, reseller computer system 190*c* is communicatively coupled to user computer system 190*a* via communication lines 306. In one embodiment of the present invention, communication lines 306 include communication links that include the World Wide Web or internet. Communication lines 306 can also include intranets and the like. The mechanisms for coupling computer systems over the Internet or over Intranets are well-known in the art. This coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode) or any other digital or analog communications network or protocol, or series of networks and protocols. It is appreciated that, in a similar manner, this interface can occur over an Intranet or using non-networked devices that are communicatively linked. Though network 172 is shown to include one reseller computer system 190*c* and one vendor computer system 190*c*, it is appreciated that network 172 can include multiple computer systems 190*b*–190*c*, and that network 172 can serve many user computer systems 190*a*.

As discussed with reference to FIG. 3A, in one embodiment, vendor computer system 190*b* operates a vendor web site that includes content (e.g., intellectual property 202 of FIG. 2) that is available for sale, license, rent, etc. In one embodiment, the vendor web and its content (including intellectual property 202) are codified using XML (Extensible Markup Language).

Continuing with FIG. 3B, in one embodiment, an e-commerce web site operates on reseller computer system 190*c* (hereinafter referred to as the "e-commerce web site"). In the present embodiment, the content of the e-commerce web site includes various intellectual properties for sale, rent, etc., each property perhaps described by text or accompanied by a picture. In one embodiment, e-commerce web site 320 and its content are codified using XML.

In one embodiment, a web browser, operable on user computer 303, couples a user to e-commerce site 301 according to Internet Protocol. This allows a user to easily access the intellectual properties available for sale and/or lease that are sold by the reseller.

In accordance with the present invention, the interface between reseller computer system 190*c* and vendor computer system 190*b* is accomplished using intellectual property management system 200 of FIG. 2. As described above, in one embodiment, the content of the vendor web site is described by an intellectual property element such as DFF 220 (specifically, DFD 226). The owner of the content of the vendor web site grants rights and spells out limitations to the reseller responsible for the e-commerce web site. In one embodiment, the rights and limitations associated with intellectual property 202 are described by an intellectual property element such as DRF 210 (specifically, DRG 216). In one embodiment, these rights and limitations are instead provided by a license described by an intellectual property element such as DLA 236.

Figure 4:
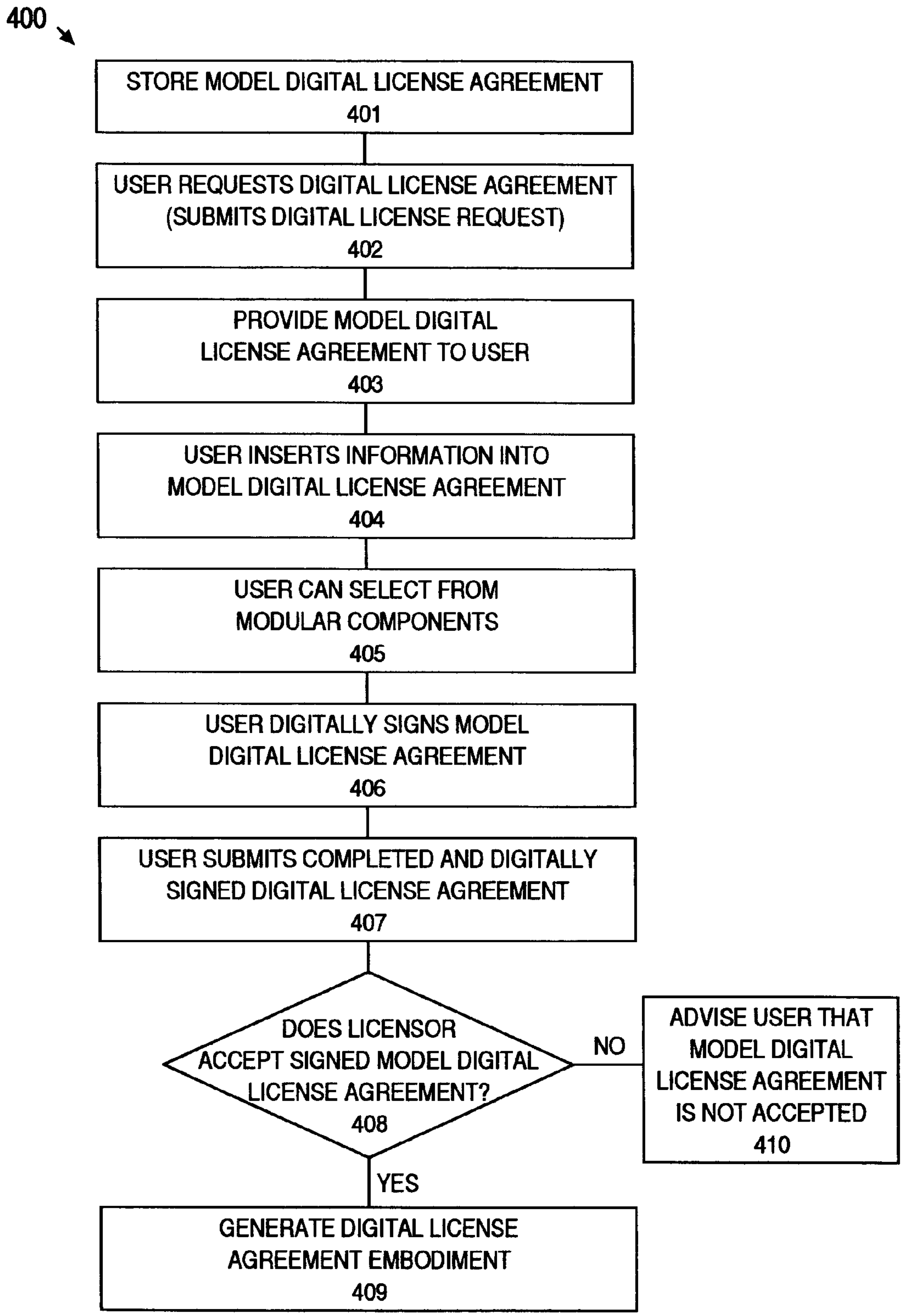
FIG. 4 is a flowchart of the steps in a method for assigning intellectual property rights in accordance with one embodiment of the present invention.

FIG. 4 shows a method 400 for assigning intellectual property rights in accordance with one embodiment of the present invention. Method 400 can be implemented via computer-readable program instructions stored in a memory unit (e.g., RAM 102, ROM 103, and/or data storage device 104) and executed by processor 101 of computer system 190 of FIG. 1.

Referring to step 401 of FIG. 4, a model digital license agreement is stored. In one embodiment of the present invention, the model digital license agreement is stored in data storage devices 104 of computer system 190 of FIG. 1. In the embodiment shown in FIG. 3*a*, the model digital license agreement is stored on server computer system 190*b*.

Digital links to intellectual property management system 200 and to the digital license agreement elements thereof are enabled. In one embodiment, a unique digital identifier (e.g., DID 205 of FIG. 2) is assigned to an intellectual property (e.g., intellectual property 202 of FIG. 2). Electronic links or hyperlinks are enabled between intellectual property 202 and the model digital license agreement elements (e.g. DLA230, DLR 235, and DLAR 236). In the present embodiments, the digital links are accessible via the internet. In the embodiment shown in FIG. 3A, digital links are provided by vendor computer system 190*b* and communication lines 306. More particularly, in the present embodiment, server computer system 190*b* provides a web site and content (e.g., intellectual property 202 of FIG. 2) that is available for sale, license, rent, etc.

As shown in step 402 of FIG. 4, a user submits a digital license request. That is, the user requests a digital license for a particular item of intellectual property. In one embodiment of the present invention, the user requests a digital license by making selections on web pages that identify the desired intellectual property. In response, as shown by step 403, a model digital license agreement is provided to the user. The user can then view the model digital license agreement. For example, in the embodiment shown in FIG. 3*a*, a user, via user computer system 190*a*, accesses vendor computer system 190*b* by accessing the vendor web site and downloads a model digital license agreement that originated from vendor computer system 190*b*. Alternatively, the model digital license agreement can be e-mailed to the user.

Referring now to step 404 of FIG. 4, the user then inserts information into the model digital license agreement. In one embodiment, the user is prompted to enter the user's name, address and telephone number. However, other information can also be required.

As shown in step 405, the user can select the whole model license agreement, or from modular components contained in the model digital license agreement to obtain a digital license agreement that meets the seller's and the user's particular needs. In one embodiment, different types of licenses, different license terms, etc. are included as modular components. This allows for a user to select, for example a license for an entire organization, a license for a single user, etc. In one embodiment, the modular components include assignable variables for final dynamic assembly and completion upon approval by the licensor.

In one embodiment of the present invention a module is provided that grants the user the right to install and operate their software, and provides terms and conditions, including a warranty. This license module does not grant the user the right to substantively modify the application in any way, nor does it grant the right to resell or sub-license the application to others.

In the present embodiment, another module is provided that provides the user no warranty, but which states that the data sets are sold as-is, granting the user the right to manipulate, modify, and resell the data in whole or in part, plus disclaiming rights to any derivative works created from the data.

In other embodiments, a substantive and extensible grammar of opinions and selections will enable users, sellers, and resellers to further customize and extend the possible combinations of user licensing models.

In one embodiment of the present invention, the user is provided with a choice of accepting or declining the license as modified by the selection of modular components, or forwarding the model digital license agreement to another party, such as a purchasing or legal contact, system, or department, for further processing.

The user then digitally signs the model digital license agreement as shown by step 406 of FIG. 4. The completed and digitally signed model digital license agreement forms a pseudo-digital license agreement representation. That is, by selecting particular modular components and entering data, a digital document is generated that represents the license agreement desired by the user, forming a digital license agreement representation that has yet to be agreed to by all parties. This pseudo-digital license agreement is then submitted as shown by step 407.

The completed and digitally signed model digital license agreement (or pseudo-digital license agreement) is made available to the licensor who can then accept or reject it as shown by step 408. In many cases, the licensor is the vendor; however, the licensor can be a third party communicatively coupled electronically to the vendor. If the licensor accepts the completed and digitally signed model digital license agreement, a digital license agreement embodiment is generated by the vendor as shown by steps 408–409.

If the licensor does not accept the completed and digitally signed model digital license agreement, the user is advised that the model digital license agreement is not accepted as shown by steps 408 and 410 of FIG. 4. In the present embodiment, if the licensor does not accept the model digital license agreement, the user is advised as to the reason for the rejection. That is, for example, if all of the required information is not submitted, or if the submitted information is determined to be inaccurate, etc. the user is advised of the deficiency.

In another embodiment, the process is reversed, and the vendor creates a pseudo-license agreement, and tenders it to a user for approval and acceptance. In yet another embodiment, an intermediary such as a channel reseller creates the pseudo-license agreement, and offers it to both the licensor and the user licensee, to see if the tender will be accepted by all parties In one embodiment, method for assigning intellectual property rights 400 of FIG. 4 is used in conjunction with the sale of a product such as, for example a software program. In this embodiment, the user is required to enter credit card information in step 404 of FIG. 4. Upon receipt of a completed and digitally signed digital license agreement (step 407 of FIG. 4), the user's credit card is debited. If the user has properly completed all required information and the user's credit card charge is approved by the credit card company, the licensor accepts the completed and signed model digital license agreement. If the credit card charge is not approved, the licensor does not accept the completed and signed model digital license agreement and the user is notified (steps 408 and 410).

In other embodiments, any form of commonly accepted legal and valid commercial transaction may be substituted for a credit card purchase. Such agreements include, but are not limited to, purchase orders or trading agreements, contracts, direct electronic funding transfers or forms of cash, cash equivalent, or electronic cash or payment systems.

Figure 5:
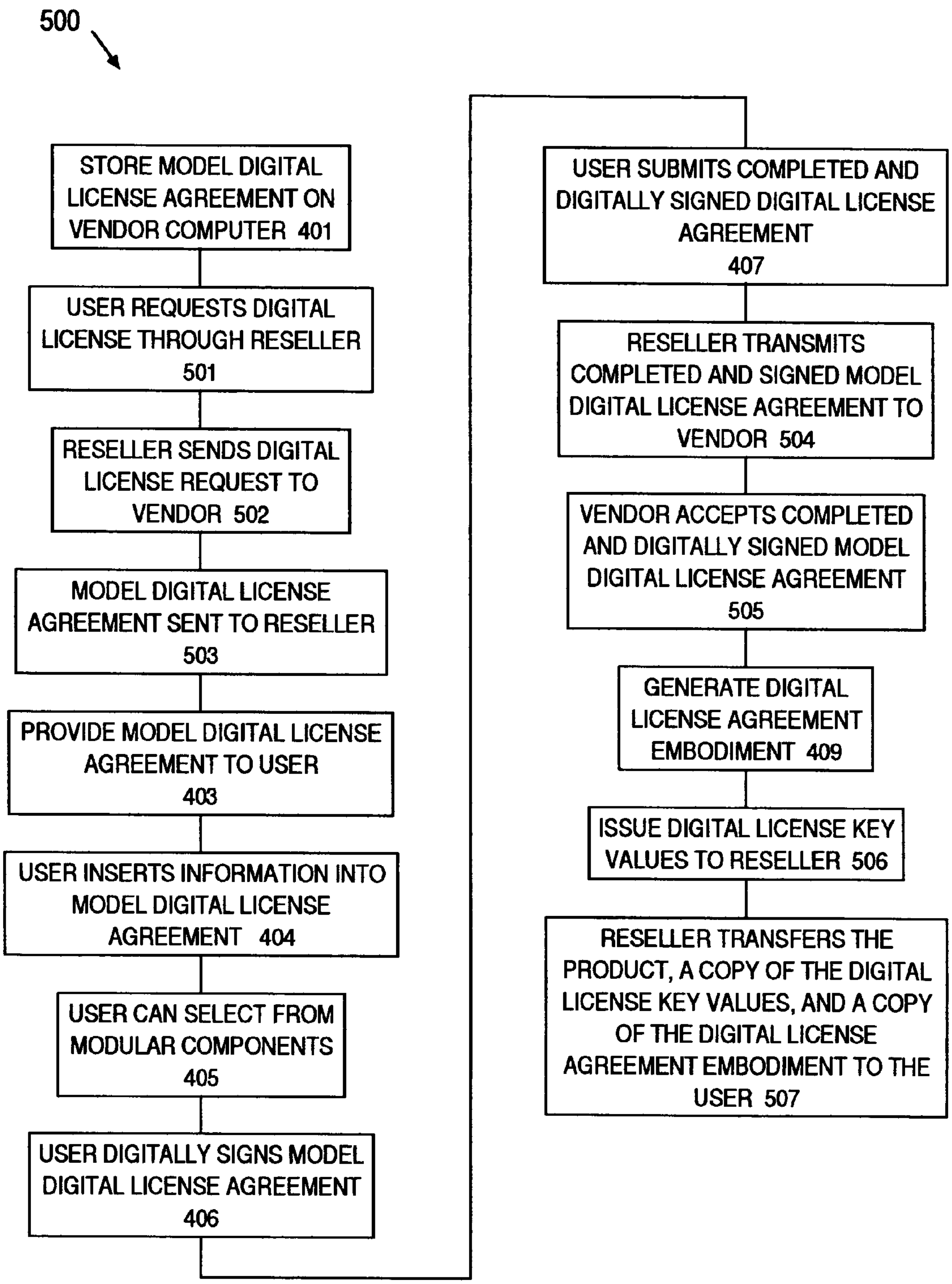
FIG. 5 is a flowchart of the steps in a method for assigning intellectual property rights using a reseller in accordance with one embodiment of the present invention.

FIG. 5 illustrates an embodiment of the present invention in which a reseller acts as an intermediary between the user and the vendor. In one embodiment, the reseller first obtains the right to resell the vendor's products using a process similar to method 400 of FIG. 4. That is, the user electronically communicates with the vendor and obtains a digital license agreement that allows the reseller to resell and license certain products. In this manner, any limited or unlimited number of intermediaries can occur between a licensor and an ultimate end user licensee, while preserving the capabilities of passing a valid license agreement through some or all of the parties involved in the commercial transaction.

Referring now to method for assigning intellectual property rights 500 of FIG. 5, in accordance with one embodiment of the present invention method 500 can be implemented via computer-readable program instructions stored in a memory unit (e.g., RAM 102, ROM 103, and/or data storage device 104) and executed by processor 101 of computer system 190 of FIG. 1.

Referring to step 401 of FIG. 5, a model digital license agreement is stored. In one embodiment of the present invention, the model digital license agreement is stored on data storage device 104 of computer system 190 shown in FIG. 1. In the embodiment shown in FIG. 3B, a model digital license agreement is stored on vendor computer system 190*b*.

As discussed with reference to FIG. 3*a*, digital links to the digital license agreement elements of intellectual property management system 200 are enabled. Also, in the present embodiment, the reseller provides an e-commerce web site that is operable on reseller computer system 190*c* of FIG. 3B that provides links to content and links enabling the request for a digital license.

As shown in step 501 of FIG. 5, a user requests a digital license through the reseller. In one embodiment, the request for a digital license takes the form of ordering a product that requires a license such as, for example, a software program. In the embodiment shown in FIG. 3B, for example, a user can request a digital license by ordering a product that requires a license on the e-commerce site operable on reseller computer system 190*c*.

Provided below is an example of a digital license request codified in XML in accordance with one embodiment of the present invention.

```
<LICENSEREQUESTS>
<DLR Type="StandardLicense">
    <Authorization Type="PSE" TimeIssued="DD-MMM-YYYY"/>
        <PSE>
            <SalesOrder SalesOrderNumber="NNNNNNN" SalesOrderDate="DD-MMM-YYYY"/>
            <PurchaseOrder PurchaseOrderNumber="AAAAA" PurchaseOrderDate="DD-MMM-YYYY"/>
            <DLA Type="EULA"/>
            <Order Type="Standard-NL"/>
        </PSE>
    </Authorization>
    <RequestingSystem>
        <HostName>[Host Name]</HostName>
        <ServerName>[Server Name]</ServerName>
        <Location>[Location]</Location>
    </RequestingSystem>
    <RequestingUser>
        <OrganizationName>ERP</OrganizationName>
        <UserName>[User Name]</UserName>
        <ContactEmailAddress>[Address]</ContactEmailAddress>
```

-continued

</RequestingUser>
<Product SubGroup="SCAN-PAK">
<LineId>nnnnnnn</LineId>
<LineNumber>1</LineNumber>
<InventoryItemId>mmmmmmm</InventoryItemId>
<ProductName>SW-WC1.0</ProductName>
<ProductDescription>WebClient user license (initial minimum order)</ProductDescription>
<OrderedQuantity>1</OrderedQuantity>
<Licensee>
<SiteContact/>
<OrganizationName>[Name]</OrganizationName>
<Address>
<StreetAddress>
<Line>
</StreetAddress>
<City/>
<State/>
<Province/>
<Zip/>
<Country/>
</Address>
</Licensee>
<Intermediary>
<SiteContact>[Name]</SiteContact>
<OrganizationName>[Name]</OrganizationName]
<Address>
<StreetAddress>
<Line>
</StreetAddress>
<City/>
<State/>
<Province/>
<Zip/>
<Country/>
</Address>
</Intermediary>
<LicenseRequested>
<PakParams/>
<NumberOfLicenses>500</NumberOfLicenses>
<LicenseParams/>
<HostOS/>
<HostName>[Name]</HostName>
<HostId>nmnmnmn</HostId>
<Pak/>
</LicenseRequested>
<LicenseDispatch>
<EmailAddress>[Address]</EmailAddress>
<OutboundDir/>
</LicenseDispatch>
</Product>
</DLR>
</LICENSEREQUESTS>

The digital license request is then sent to the vendor as shown by step 502. In the embodiment shown in FIG. 3B, for example, the digital license request is sent from reseller computer system 190*c* to vendor computer system 190*b*. In one embodiment of the present invention, a reseller is required to also submit electronically, with each digital license request, a Reseller Sales Entitlement attachment that identifies the reseller as an authorized reseller.

Continuing with FIG. 5, as shown by step 503, upon receiving a digital license request, the vendor sends a model digital license agreement to the reseller. In the embodiment shown in FIG. 3B, the model digital license agreement is sent from vendor computer system 190*b* to reseller computer system 190*c*. In the present embodiment, the vendor, prior to sending the model digital license agreement, interprets and processes the digital rights of the reseller and only transmits a model digital license agreement when the reseller is authorized to provide sales and service of the product.

As shown in step 403 of FIG. 5, the model digital license agreement is then provided to the user. In one embodiment of the present invention, referring to the embodiment shown in FIG. 3*b*, the model digital license agreement is sent from reseller computer system 190*c* to user computer system 190*a*.

Referring now to step 404 of FIG. 5, the user then inserts information into the model digital license agreement. In one embodiment, the user is prompted to enter the user's name, address and telephone number. However, other information can also be required.

As shown in step 405, the user can select from modular components contained in the model digital license agreement to obtain a digital license agreement that meets the user's particular needs. This allows the user to create standard and desired terms and conditions, thereby allowing customization of the agreement to meet the user's particular needs.

The user then digitally signs the model digital license agreement as shown by step 406 of FIG. 5. In one embodiment, a digital signature is provided using a user's web browser. However, alternatively, any of a number of other methods for authenticating the document can be used for assuring the identity of the user.

The completed and digitally signed model digital license agreement is then submitted as shown by step 407 of FIG. 5. Thus, for example, in the embodiment shown in FIG. 3B, the model digital license agreement is sent from user computer system 190*a* to reseller computer system 190*c*.

The reseller transmits the completed and digitally signed model digital license agreement (or pseudo-digital license agreement) to the vendor as shown by step 504. In the embodiment shown in FIG. 3B, the completed and signed model digital license agreement is sent from reseller computer system 190*c* to vendor computer system 190*b*.

The vendor can either accept of reject the model digital license agreement. When the vendor accepts the completed and signed model digital license agreement, a digital license agreement representation is formed that represents a legally binding digital license agreement between the parties thereto. As shown by steps 505 and 409, when the vendor accepts the model digital license agreement, a digital license agreement embodiment is generated. That is, a digital document evidencing the terms and conditions that were agreed to is generated. In one embodiment of the present invention, the acceptance process includes the steps of validating and certifying the signed and completed model digital license agreement and recordation of the digital license agreement in the vendor's records.

The digital license agreement embodiment, either a model or a representation, should ideally conform to acceptable and customary use standards for the community and jurisdiction of its application. In one embodiment, models of the system are re-configurable, updatable, or installable to allow for continuing conformance to current standards and practices of the community and jurisdiction of its application.

The present invention thereby provides a digital license agreement embodiment that is separate from the embodiment of the intellectual property. In one embodiment of the present invention the digital license agreement is a separate document. This digital license agreement can be executed or transferred between parties before, at the time of, or following the transfer of the intellectual property itself. Alternatively, the digital license agreement is an item included within, but that can be extracted from, its encapsulation within the embodiment of the intellectual property. This enables an intellectual property to self-declare its licensing terms and conditions, and enables a user to understand their rights of use, operation, treatment, distribution and handling.

The resulting digital license agreement embodiment forms a legally binding license agreement between the parties thereto. The digital license agreement of the present invention reflects the needs of the parties and is quickly and effectively transacted.

Provided below is an example of a digital license agreement codified in XML in accordance with one embodiment of the present invention.

```
<DLA version="1.0">
    <License Type=[EULA|ILA]"
        Description="[End User License Agreement|Intermediary License Agreement]"
        DLANumber="[DLANumber]">
      <Authorization Type="PSE" Description="Product Sales Entitlement">
        <PSE>
          <SalesOrder SONumber=""SODate=""/>
          <PurchaseOrder PONumber=""PODate+""/>
          <Order Type="[Resale|Internal]"/>
        </PSE>
      </Authorization>
      <Agreement>
          <Licensor>
          </Licensor>
          <Intermediary>
          </Intermediary>
          <Licensee>
          </Licensee>
      </Agreement>
      <TermsAndConditions>
        <LicensePeriod Type="[Perpetual|Limited]">
          <StartDate>[YYYY-MM-DDTHH:MM-GGGG]</StartDate>
          <TerminalDate>[YYYY-MM-DDTHH:MM-GGGG]</TerminalDate>
        </LicensePeriod>
      </TermsAndConditions>
      <ProductList>
        <Product
ProductLineNo=""ProductName=""ProductDesc=""ProductQty=""ProductLicenseID="">
        </Product>
        <Product
ProductLineNo=""ProductName=""ProductDesc=""ProductQty=""ProductLicenseID="">
          <ProductOrderAttributes>
            <PakParams>                    </PakParams>
            <LicenseBlocks>[CSV numerical values]</LicenseBlocks>
            <LicenseParams>         </LicenseParams>
            <HostOS>                       </HostOS>
            <HostName>                     </HostName>
```

-continued

```
            <HostID>                    </HostID>
            <ChassisID>            </ChassisID>
            <Pak>                  </Pak>
          </ProductOrderAttributes>
        </Product>
      </ProductList>
      <LicenseKeyList>
        <LicenseKey ProductLicenseID="">
        <LicenseKeyDescription>[License Key Description</LicenseKeyDescription>
        <LicenseKeyValue>[License Key Value]</LicenseKeyValue>
        <LicenseKeyHref="[URI]">[Description of [URI]</LicenseKeyHref>
      </LicenseKeyList>
      <InstallationInstructions ProductLicenseID="">
        <TextInstructionBlock>
        </TextInstructionBlock>
      </InstallationInstructions>
    </License>
</DLA>
```

Regarding the example digital license agreement codified above, the authorization key may be a public key, a digital certificate, or some other form of authentication. The "intermediary" block is used in cases of an intermediary license agreement or a channel-delivered EULA (End User License Agreement). In the "terms and conditions" block, legal terms of the agreement are included and can be an ASCII text block, or XML formatted text, or an external reference via URI to other local or remote documents. The terms and conditions are included for the elements listed in the "product list" block. The product list can be reiterated from the digital license representation. The products can include a list of character-data license key values or an external pointer to an associated file that contains license-related data. The "product license ID" attribute is a local file reference to the "license key" element.

Referring now to step 506 of FIG. 5, in one embodiment of the present invention, digital license key data in the form of digital license key values are issued to the reseller. Other types of digital license key data could also be used such as, for example, digitally encapsulated data providing a technical protection of the intellectual property. In the present embodiment, the digital license keys must be installed into the end-user's copy of the product to operate the product.

As shown by step 507 of FIG. 5, the reseller transfers the product, a copy of the digital license key values, and a copy of the digital license agreement embodiment to the user. In one embodiment, the items transferred pursuant to step 507 are transferred electronically from the vendor to the user. That is, in the embodiment shown in FIG. 3B, the reseller transfers the product electronically from reseller computer system 190*c* to user computer system 190*a*. Alternatively, the product, a copy of the digital license key values, and a copy of the digital license agreement can be transmitted directly from the vendor to the user.

The methods of the present invention are used advantageously for the sale of items that can be readily copied such as, for example, software products. Other forms of digital content protection, such as license keys or files, digital signatures or certificates, or techniques of a protective nature can be included within this framework. More particularly, referring to FIG. 3B, a user operating user computer system 190*a* can order a software product by accessing the e-commerce site operated by reseller computer system 190*c*. The user can electronically arrange with the reseller for payment (e.g. the user can provide a credit card number). Upon submission of a digital license request, the user receives a model digital license agreement, which is then easily completed and digitally signed. Upon submission of the completed and signed model digital license agreement, digital license keys are issued to the reseller. The reseller then makes a copy of the software product, and a copy of the license key values. The reseller then sends electronically the copy of the product and the digital license key values and the digital license agreement embodiment to the user via user computer system 190*a*. The user can then install and configure their software. The user can then store or forward their copy of the digital license agreement embodiment for future service and support requirements or for legal or fiscal record keeping and reporting.

Though the present invention is described with reference to the use of the Internet Protocol for encapsulating and sending messages in the present invention, the methods and system of the present invention is also well suited for translations and/or encapsulations over other data and markup languages using IP over IP gateways. Also, licenses can be exported or imported into the system from physical world representations or embodiments such as scanning in a printed license agreement and parsing it into appropriate digital license agreement format, or taking a digital license agreement and physically printing it as a document for a human to read, hold and/or archive.

The examples disclosed in the discussion relating to method 400 of FIG. 4 and method 500 of FIG. 5 provide for effectively and efficiently licensing of intellectual property for end users that desire conventional and specialized license agreements that are somewhat standardized. However, the methods and apparatus of the present invention are also quite effective for conducting extensive negotiations between the parties via the transmission of repeated digital license requests and responses thereto. Thereby, customized and complex agreements can be formed for such complex situations as, for example, reseller license agreements, site licenses, customized or localized terms and conditions, etc.

The digital license agreements of the present invention can be embedded in a physical device, either through an electronic storage component, or can be represented by a visual symbol or other physical marking, such as a bar code of a printed Uniform Resource Identifier (URI) that refers to a local or network queryable digital license agreement, or otherwise transferred without the use of a computer network.

Thus, the method and system of the present invention allows for the efficient and cost effective assignment of intellectual property. Furthermore, the method and system of the present invention accommodates commonly-accepted legal and financial standards and systems.

In addition to application in the software industry, the present invention can be extended to the telecommunications industry, which has embodiments and representations of rights of access or use of a network as well as intellectual properties such as pay-per-view movies and events. Similarly, the present invention can be extended to general content media properties, such as music or other audio, video and film, written literature, news, specialized data and information sources such as medical and financial records, and so on.

The preferred embodiment of the present invention, intellectual property over Internet Protocol framework, is thus described. While the present invention has been described in particular embodiments, it should be appreciated that the present invention should not be construed as limited by such embodiments, but rather construed according to the following claims.

What is claimed is:

1. A method for assigning intellectual property rights, said method comprising the computer implemented steps of:

a) storing a model digital license agreement that defines terms for licensing intellectual property related to a product to be sent to a user;

b) enabling electronic links to said model digital license agreement such that said terms for licensing an said intellectual property can be viewed by said user;

c) enabling an electronic selection and acceptance by said user of said terms for licensing said intellectual property prior to sending said product to said user, wherein said model digital license agreement includes a plurality of modular components that are individually selected by said user to define the terms of said model digital license agreement;

d) sending a product to a said user after the terms of said model digital license agreement that are selected by said user are approved by a vendor of said product, said model digital license agreement that is approved defining the intellectual property rights granted to said user that relate to said product;

e) sending a copy of said model digital license agreement that is approved to said user; and f) sending a digital license key data to said user, said digital license key data enabling the operation of said product.

2. A method for assigning intellectual property rights as recited in claim 1 wherein step c) further comprises the steps of:

c1) enabling a user to insert information into said model digital license agreement; and c2) enabling said user to digitally sign and certify said model digital license agreement.

3. A method for assigning intellectual property rights as recited in claim 2 further comprising the step of:

g) generating a digital license agreement embodiment upon receipt of a digitally signed model digital license agreement that includes any required information and upon acceptance thereof by a licensor, said digital license agreement embodiment defining the intellectual property rights conveyed to said user.

4. A method for assigning intellectual property rights as recited in claim 2 wherein said model digital license agreement in step a) is stored at a first location, and wherein said terms for licensing said an intellectual property can be viewed at a second location, said method enabling a user to electronically accept said terms for licensing said intellectual property at said second location.

5. A method for assigning intellectual property rights as recited in claim 4 wherein said model digital license agreement includes a plurality of modular components that define intellectual property rights that can be accepted by said user, said plurality of modular components allowing said user to accept ones of said plurality of modular components to obtain a digital license agreement that meets the needs of said user, said method further comprising the step of:

g) generating a digital license agreement embodiment upon receipt of a digitally signed model digital license agreement that includes any required information and upon acceptance thereof by a licensor, said digital license agreement embodiment defining the intellectual property rights represented by the modular components accepted by said user.

6. A method for assigning intellectual property rights as recited in claim 1 wherein step b) further comprises the steps of:

b1) enabling a reseller to request a model digital license agreement upon receipt of a request from a user;

b2) sending a model digital license agreement to said reseller; and b3) allowing a user to view said model digital license agreement.

7. A method for assigning intellectual property rights as recited in claim 6 wherein step c) further comprises the steps of:

c1) enabling said user to insert information into said model digital license agreement; and c2) enabling said user to digitally sign said model digital license agreement.

8. A method for assigning intellectual property rights as recited in claim 7 wherein said model digital license agreement includes a plurality of modular components that define intellectual property rights that can be accepted by said user, said plurality of modular components allowing said user to accept ones of said plurality of modular components to obtain a digital license agreement that meets the needs of said user.

9. A method for assigning intellectual property rights as recited in claim 6 wherein step b2) further includes determining whether said reseller is an authorized reseller of a product, and generating a model digital license agreement upon receipt of a request for a digital license agreement from said reseller when said reseller is determined to be an authorized reseller of said product.

10. A method for assigning intellectual property rights as recited in claim 9 further comprising the steps of:

g) providing a digital license key value to said reseller;

h) producing a copy of said product; and i) sending said copy of said product and sending said digital license key value from said reseller to said user, said digital license key value enabling the operation of said copy of said product.

11. A computer system comprising:

a bus;

a processor coupled to said bus; and a memory unit coupled to said bus, said processor for executing a method for assigning intellectual property rights, said method comprising the steps of:

a) storing a model digital license agreement that defines terms for licensing intellectual property related to a product to be sent to a user;

b) enabling electronic links to said model digital license agreement such that said terms for licensing said intellectual property can be viewed by said user;

c) enabling an electronic selection and acceptance by said user of said terms for licensing said intellectual property prior to sending said product to said user, wherein said model digital license agreement includes a plurality of modular components that are individually selected by said user to define the terms of said model digital license agreement;

d) sending a product to said user after the terms of said model digital license agreement that are selected by said user are approved by a vendor of said product, said model digital license agreement that is approved defining the intellectual property rights granted to said user that relate to said product;

e) sending a copy of said model digital license agreement that is approved to said user; and f) sending a digital license key data to said user, said digital license key data enabling the operation of said product.

12. A computer system as recited in claim 11 wherein said processor performs said method for assigning intellectual property rights and wherein step c) further comprises the steps of:

c1) enabling a user to insert information into said model digital license agreement; and c2) enabling said user to digitally sign said model digital license agreement.

13. A computer system as recited in claim 12 wherein said processor performs said method for assigning intellectual property rights, said method further comprising the step of:

g) generating a digital license agreement embodiment upon receipt of a digitally signed model digital license agreement that includes any required information and upon acceptance thereof by a licensor, said digital license agreement embodiment defining the intellectual property rights conveyed to said user.

14. A computer system as recited in claim 13 wherein said processor performs said method for assigning intellectual property rights and wherein said model digital license agreement in step a) is stored at a first location, and wherein said terms for licensing said an intellectual property can be viewed at a second location, said method enabling a user to electronically accept said terms for licensing said intellectual property at said second location.

15. A computer system as recited in claim 14 wherein said processor performs said method for assigning intellectual property rights and wherein said model digital license agreement includes a plurality of modular components that define intellectual property rights that can be accepted by said user, said plurality of modular components allowing said user to accept ones of said plurality of modular components to obtain a digital license agreement that meets the needs of said user, said method further comprising the step of:

g) generating a digital license agreement embodiment upon receipt of a digitally signed model digital license agreement that includes any required information and upon acceptance thereof by a licensor, said digital license agreement embodiment defining the intellectual property rights represented by the modular components accepted by said user.

16. A computer system as recited in claim 11 wherein said processor performs said method for assigning intellectual property rights and wherein step b) further comprises the steps of:

b1) enabling a reseller to request a model digital license agreement upon receipt of a request from a user;

b2) sending said model digital license agreement to said reseller; and b3) allowing a user to view said model digital license agreement.

17. A computer system as recited in claim 16 wherein said processor performs said method for assigning intellectual property rights and wherein step c) further comprises the steps of:

c1) enabling said user to insert information into said model digital license agreement; and c2) enabling said user to digitally sign said model digital license agreement.

18. A computer system as recited in claim 17 wherein said processor performs said method for assigning intellectual property rights and wherein said model digital license agreement includes a plurality of modular components that define intellectual property rights that can be accepted by said user, said plurality of modular components allowing said user to accept ones of said plurality of modular components to obtain a digital license agreement that meets the needs of said user.

19. A computer system as recited in claim 16 wherein step b2) further includes determining whether said reseller is an authorized reseller of a product, and generating a model digital license agreement upon receipt of a request for a model digital license agreement from said reseller when said reseller is determined to be an authorized reseller of said product.

20. A computer system as recited in claim 19 wherein said processor performs said method for assigning intellectual property rights, said method further comprising the steps of:

g) providing a digital license key value to said reseller;

h) producing a copy of said product; and i) sending said copy of said product and sending said digital license key value from said reseller to said user, said digital license key value enabling the operation of said copy of said product.

21. A computer-useable medium having computer readable program code embodied therein for causing a computer system to perform the steps of:

a) storing a model digital license agreement that defines terms for licensing intellectual property related to a product to be sent to a user;

b) enabling electronic links to said model digital license agreement such that said terms for licensing said intellectual property can be viewed by said user;

c) enabling an electronic selection and acceptance by said user of said terms for licensing said intellectual property prior to sending said product to said user, wherein said model digital license agreement includes a plurality of modular components that are individually selected by said user to define the terms of said model digital license agreement;

d) sending a product to said user after the terms of said model digital license agreement that are selected by said user are approved by a vendor of said product, said model digital license agreement that is approved defining the intellectual property rights granted to said user that relate to said product;

e) sending a copy of said model digital license agreement that is approved to said user; and f) sending a digital license key data to said user, said digital license key data enabling the operation of said product.

22. A computer-usable medium as recited in claim 21 wherein step c) further comprises the steps of:

c1) enabling said user to insert information into said model digital license agreement; and c2) enabling said user to digitally sign said model digital license agreement.

23. A computer-usable medium as recited in claim 22 wherein said computer-readable program code embodied therein causes a computer system to perform the step of:

g) generating a digital license agreement embodiment upon receipt of a digitally signed model digital license agreement that includes any required information and upon acceptance thereof by a licensor, said digital license agreement embodiment defining the intellectual property rights conveyed to said user.

24. A computer-usable medium as recited in claim 23 said model digital license agreement in step a) is stored at a first location, and wherein said terms for licensing said an intellectual property can be viewed at a second location, said method enabling a user to electronically accept said terms for licensing said intellectual property at said second location.

25. A computer-usable medium as recited in claim 24 wherein said model digital license agreement includes a plurality of modular components that define intellectual property rights that can be accepted by said user, said plurality of modular components allowing said user to accept ones of said plurality of modular components to obtain a digital license agreement that meets the needs of said user, and wherein said computer-readable program code embodied therein causes a computer system to perform the step of:

g) generating a digital license agreement embodiment upon receipt of a digitally signed model digital license agreement that includes any required information and upon acceptance thereof by a licensor, said digital license agreement embodiment defining the intellectual property rights represented by the modular components accepted by said user.

26. A computer-usable medium as recited in claim 21 wherein step b) further comprises the steps of:

b1) enabling a reseller to request a model digital license agreement upon receipt of a request from a user;

b2) sending said model digital license agreement to said reseller; and b3) allowing a user to view said model digital license agreement.

27. A computer-usable medium as recited in claim 26 wherein step c) further comprises the steps of:

c1) enabling said user to insert information into said model digital license agreement; and c2) enabling said user to digitally sign said model digital license agreement.

28. A computer-usable medium as recited in claim 27 wherein said model digital license agreement includes a plurality of modular components that define intellectual property rights that can be accepted by said user, said plurality of modular components allowing said user to accept ones of said plurality of modular components to obtain a digital license agreement that meets the needs of said user.

29. A computer-usable medium as recited in claim 26 wherein step b2) further includes determining whether said reseller is an authorized reseller of a product, and generating a model digital license agreement upon receipt of a request for a model digital license agreement from said reseller when said reseller is determined to be an authorized reseller of said product.

30. A computer-usable medium as recited in claim 29 wherein said computer-readable program code embodied therein causes a computer system to perform the step of:

g) providing a digital license key value to said reseller;

h) producing a copy of said product; and i) sending said copy of said product and sending said digital license key value from said reseller to said user, said digital license key value enabling the operation of said copy of said product.

* * * * *